United States Patent [19]

Hirosawa

[11] Patent Number: 4,496,989
[45] Date of Patent: Jan. 29, 1985

[54] METHOD FOR COMPOSING AND RECORDING A PICTURE AND A CHARACTER BY USING PICTURE SIGNALS AND CHARACTER SIGNALS FOR USE IN A PICTURE REPRODUCING MACHINE

[75] Inventor: Makoto Hirosawa, Kyoto, Japan

[73] Assignee: Dainippon Screen Seizo Kabushiki Kaisha, Kyoto, Japan

[21] Appl. No.: 390,373

[22] Filed: Jun. 21, 1982

[30] Foreign Application Priority Data

Jul. 16, 1981 [JP] Japan ................................. 56-111111

[51] Int. Cl.³ .............................................. H04N 1/40
[52] U.S. Cl. .................................... 358/296; 358/280; 364/523
[58] Field of Search ................. 358/75, 280, 256, 257, 358/78, 296, 283, 298; 364/523

[56] References Cited

U.S. PATENT DOCUMENTS

| | | | |
|---|---|---|---|
| 4,135,212 | 1/1979 | Pugsley | 358/296 |
| 4,149,145 | 4/1979 | Hartke | 358/133 |
| 4,320,419 | 3/1982 | Cottriall | 358/75 |
| 4,334,240 | 6/1982 | Franklin | 358/78 |
| 4,350,996 | 9/1982 | Rosenfeld | 358/78 |
| 4,413,275 | 11/1983 | Horiuchi | 358/78 |

Primary Examiner—Howard W. Britton
Attorney, Agent, or Firm—Poms, Smith, Lande & Rose

[57] ABSTRACT

A method for composing and recording a picture and a character by using picture signals and character signals, for use in a picture reproducing machine such as a layout color scanner and a color facsimile, wherein an original picture having a continuous gradation is scanned to obtain a picture signal representing one picture element area, wherein a recording signal representing one recording picture element area corresponding to the one picture element area is prepared from the picture signal, and wherein a halftone picture is reproduced directly depending on the recording signal, is disclosed. Each recording picture element area in which the character is recorded, is sub-divided into a plurality of character picture element areas, each corresponding to one character picture element represented by one character signal having two-value levels, and the picture signal and the character signal are selectively output or composed as the recording signal per one picture element, whereby reproducing a combination of the picture and the character on a photosensitive material.

10 Claims, 8 Drawing Figures

FIG. 2
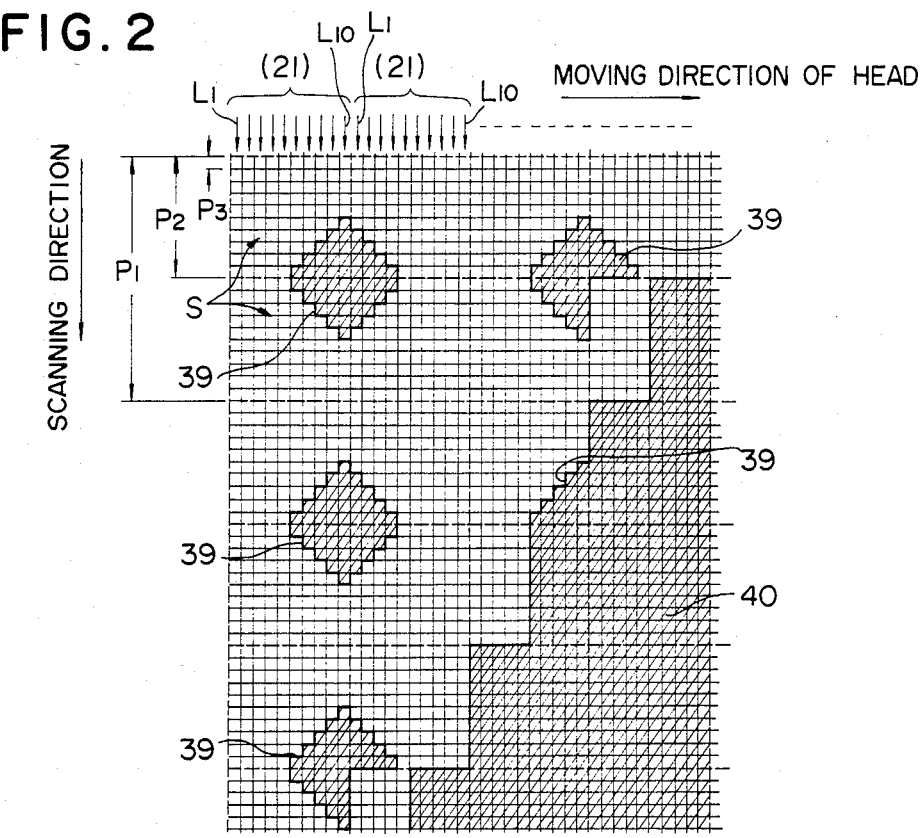
FIG. 3
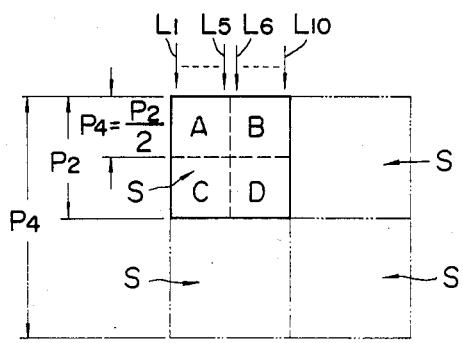
FIG. 4
| 0 | 0 | F | E | D | C | B | A |
|---|---|---|---|---|---|---|---|
| 8 | 7 | 6 | 5 | 4 | 3 | 2 | 1 |

METHOD FOR COMPOSING AND RECORDING A PICTURE AND A CHARACTER BY USING PICTURE SIGNALS AND CHARACTER SIGNALS FOR USE IN A PICTURE REPRODUCING MACHINE

BACKGROUND OF THE INVENTION

The present invention relates to a method for composing and recording a picture having a continuous gradation and a character having two-value levels such as white and black in the desired layout positions by using picture signals and character signals in a digital manner, for use in a picture reproducing machine such as a color scanner and a color facsimile.

In a conventional picture reproducing machine such as a color scanner for plate making, a plurality of original pictures can be reproduced on a photosensitive material in the desired layout positions. Some method have been developed for carrying out this. Now, a picture having a continuous gradation and characters having two-value levels such as white and black are expected to be composed and recorded in the desired layout positions on a photosensitive material.

When such a picture and characters composed are recorded in the desired layout positions, since the characters composed of fine lines and curves are recorded in the image having two-value levels such as white and black, the characters should be processed with a higher resolving power than the picture. Hence, when the picture is processed with the same higher resolving power as the characters should be, the processing time increases. Further, when the picture is processed with much higher resolving power than it needs, the capacity of the memory increases largely.

Further, when the picture and the characters are separately laid out, two memories for the picture and the characters are required. Each memory for the layout should have a memory space for storing picture signals corresponding to at least one picture but usually a plurality of pictures. Hence, in this case, two memories having a large capacity are necessary, which is uneconomical.

SUMMARY OF THE INVENTION

It is an object of the present invention to provide a method for composing and recording a picture having a continuous gradation and characters having two-value levels such as white and black in the desired layout positions by using picture signals and character signals, for use in a picture reproducing machine such as a color scanner and a color facsimile, free from the aforementioned disadvantages and inconveniences, which is quick, reliable and economical.

According to the present invention there is provided a method for composing and recording a picture and a character by using picture signals and character signals, for use in a picture reproducing machine wherein an original picture having a continuous gradation is scanned to obtain a picture signal which represents one picture element area, wherein a recording signal which represents one recording picture element area corresponding to the one picture element area, is prepared from the picture signal, and wherein a halftone picture is reproduced directly depending on the recording signal, the improvement wherein each recording picture element area in which the character picture element areas, each corresponding to one character picture element represented by one character signal having two-value levels, and wherein either picture signal or character signals are selectively output as the recording signal per one picture element, whereby reproducing a combination of the picture and the character on a photosensitive material.

According to the present invention there is also provided a method for composing and recording a picture and a character by using picture signals and character signals, for use in a picture reproducing machine wherein an original picture having a continuous gradation is scanned to obtain a picture signal which represents one picture element area, wherein a recording signal which represents one recording picture element area corresponding to the one picture element area, is prepared from the picture signal, and wherein a halftone picture is reproduced directly depending on the recording signal, the improvement wherein each recording picture element area in which the character is recorded, is subdivided into a plurality of character picture element areas, each corresponding to one character picture element represented by one character signal having two-value levels, and wherein the picture signal and the character signals are composed to produce the recording signal per one picture element, whereby reproducing a combination of the picture and the character on a photosensitive material.

BRIEF DESCRIPTION OF DRAWINGS

In order that the present invention may be better understood, preferred embodiments thereof will be described with reference to the accompanying drawings, in which:

FIG. 2 is an enlarged view of a halftone picture including a part of a character therein, reproduced by a method according to the present invention;

FIG. 3 shows picture elements of picture and picture elements of character according to the present invention;

FIG. 4 shows a data format for storing a plurality of data for picture elements of character in a character memory in synchronization with an address according to the present invention;

DESCRIPTION OF THE PREFERRED EMBODIMENTS

Figure 1:
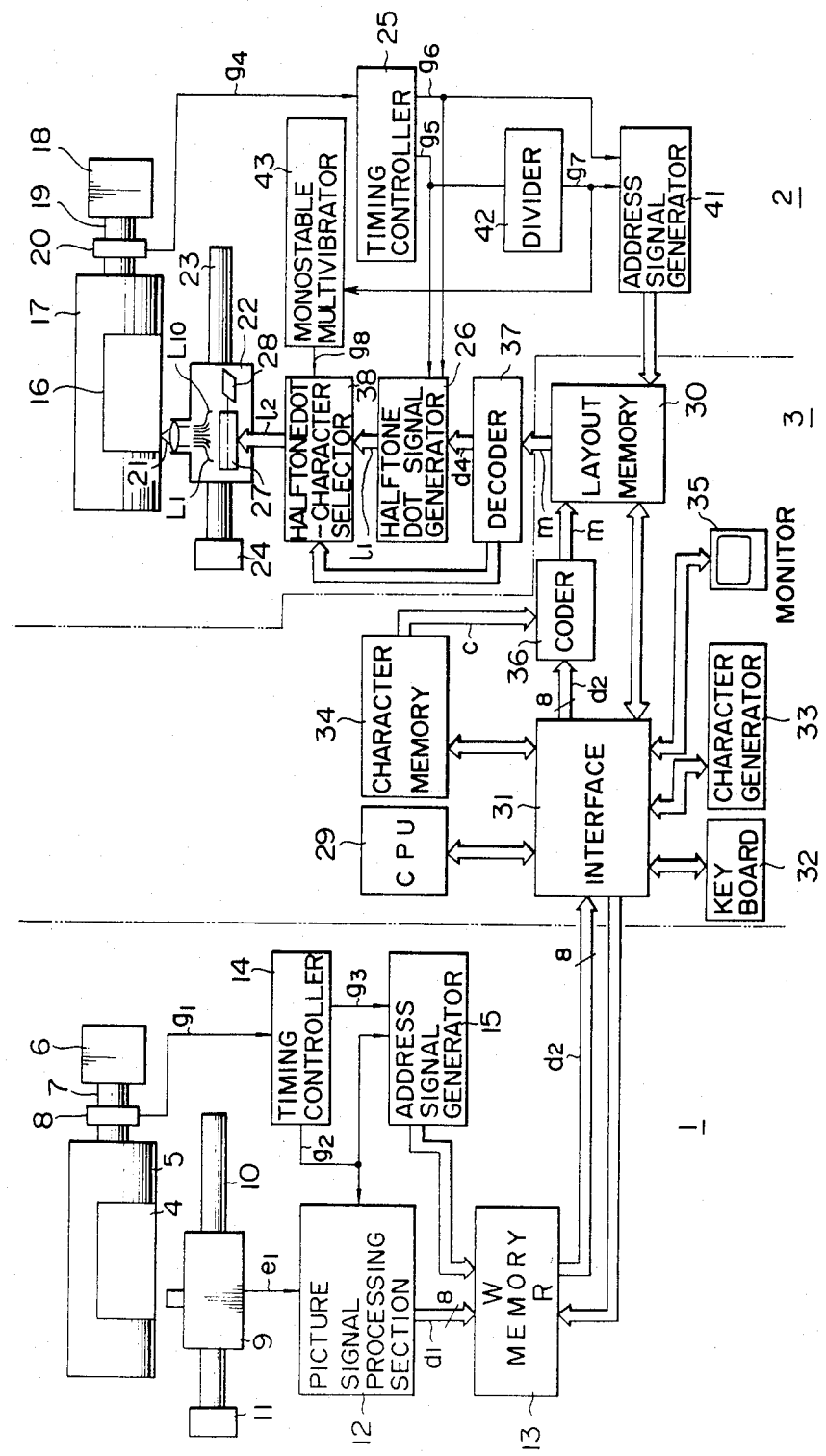
FIG. 1 is a block diagram of a layout color scanner which carries out a method according to the present invention

Referring now to the drawings there is shown in FIG. 1 a layout color scanner which carries out a method according to the present invention and which comprises a picture scanning means 1, a recording scanning means 2, and a layout means 3.

The picture scanning means 1 of a conventional type comprises a picture cylinder 5 on which an original picture 4 is mounted, a motor 6 for driving the picture cylinder 5 via a rotary shaft 7, a rotary encoder 8 mounted to the rotary shaft 7, a pickup head 9 for photoelectrically scanning the original picture 4, a screw rod 10 extending in parallel with the axis of the picture cylinder 5, on which the pickup head 9 is movably mounted, and a motor 11 which rotates the screw rod 10 so as to move the pickup head 9 along the screw rod 10.

The pickup head 9 outputs an analog picture signal $e_1$ to a picture signal processing section 12 in which the analog picture signal $e_1$ is converted into a digital signal and is color-controlled such as a masking correction, a color correction, and a gradation correction in a conventional manner to obtain a color-corrected digital picture signal $d_1$ of a certain bits, for example, eight bits. Thus the obtained color-corrected digital picture signal $d_1$ is sent to a memory 13.

The rotary encoder 8 outputs two kinds of timing pulses $g_1$ to a timing controller 14 which generates a clock pulse $g_2$ for converting the analog signal into the digital signal, and a start pulse $g_3$ for determining the scanning start point. The clock pulse $g_2$ is sent to the picture signal processing section 12, and the clock pulse $g_2$ and the start pulse $g_3$ are sent to an address signal generator 15 which controls addresses of the memory 13 in the writing mode. The memory 13 possesses an address space enough to store the picture signals $d_1$ corresponding to at least one original picture 4.

The recording scanning means 2 comprises a recording cylinder 17 on which a photosensitive material 16 is mounted, a motor 18 for driving the recording cylinder 17 via a rotary shaft 19, a rotary encoder 20 mounted to the rotary shaft 19, a recording head 22 which projects a line of light beams 21 which are optically modulated according to a recording signal, onto the photosensitive material 16, a screw rod 23 arranged in parallel with the axis of the recording cylinder 17, on which the recording head 22 is movably mounted, and a motor 24 which rotates the screw rod 23 so as to move the recording head 22 along the screw rod 23.

According to the present invention, the recording scanning means 2 can reproduce a halftone picture directly with a sufficiently higher resolving power than that of the picture scanning means 1. This higher resolving power can be obtained by using a plurality of exposure light beams passing through, for example, ten light paths $L_1$–$L_{10}$, each exposure light beam having a finer pitch than the moving pitch of the recording head 22 per one rotation of the recording cylinder 17.

Each of the light paths $L_1$–$L_{10}$, corresponding to the digital signal of one bit, is independently controlled to be open or close, thereby exposing the photosensitive material 16 to the two-value states, i.e. the exposed and the unexposed parts such as black and white. On this occasion, the digital picture signal having the continuous gradation is converted into the corresponding halftone dot area rate, resulting in recording of the halftone picture.

A method and an apparatus for reproducing a reproduction picture directly from the digital picture signals having the continuous gradation have been developed, as disclosed in Japanese patent application No. 56-55841 corresponding to U.S. patent application Ser. No. 365,890, and thus the detailed description is omitted.

The rotary encoder 20 outputs two kinds of timing pulses $g_4$ to a timing controller 25 in which the timing pulses $g_4$ are converted into a clock pulse $g_5$ having a necessary period for producing a halftone dot, and a start pulse $g_6$ for determining the recording start point.

These pulses $g_5$ and $g_6$ are sent to a halftone dot signal generator 26.

The halftone dot signal generator 26 receives the digital picture signal and outputs a light path open-close control signal $l_1$ for recording a halftone dot pattern corresponding to the digital picture signal. The light path open-close control signal $l_1$ is fed to a light path open-close controller 27 included in the recording head 22 as a control signal $l_2$ via a halftone dot-character selector 38, as hereinafter described in detail. The light path open-close controller 27 separates a light beam generated by a laser 28 into ten light beams, each being controlled to be passed or stopped by a light modulator such as an acoustooptic modulator, or the like.

The layout means 3 comprises a central processing unit 29, hereinafter referred to as CPU, such as a microprocessor a memory 30 for the layout, and an interface 31 connecting the CPU 29 and the layout memory 30. A digital picture signal $d_2$ read out of the memory 13 is transferred to the layout memory 30 via the interface 30 by properly addressing by means of the CPU 29 depending on the desired layout.

A key board 32, a character generator 33, a character memory 34, a CRT monitor 35, and so forth, are connected to the CPU 29 via the interface 31. The key board 32 inputs the necessary data for the layout processing to the CPU 29. The character generator 33 generates the character to be composed into the original picture, and the size and the style of the character are properly determined by the key board 32. Picture elements of character, hereinafter referred to as "character picture elements", differing from the "picture element" of picture, which show the form of the character, are once stored in the character memory 34 in the form of data formats mentioned hereinafter.

The CRT monitor 35 monitors an image stored in the memory 13, an image stored in the layout memory 34 in the course of the layout and after the same, and the size and the position of the character in the picture.

In this embodiment, the area of one picture element of picture corresponds to a plurality of character picture elements, in other words, one picture element area is divided into a plurality of character picture element areas, and the data of these character picture elements are stored in one address of the character memory 34 with the same bit number as that of the data which represents the density of one picture element of picture.

However, there is no need that the bit number of the data of such character picture elements is the same as that of the data of one picture element of picture, and the data of the character picture elements may be expressed by a larger bit number than the above in order to increase the resolving power.

In this embodiment, one picture element area is divided into a plurality of character picture element areas, for example, four areas. While the data representing the density of one picture element is expressed by one word of 8 bits, the data of the four character picture elements corresponding to one picture element is expressed by the lower four bits of an 8 bits binary code, and a data for discriminating between the picture and the character and a data for determining whether the density data of the picture is added in the background of the character or not, as occasion demands, use two bits of the remaining four bits as a separation bit and a discrimination bit, respectively, as shown in FIG. 4.

In the character memory 34, the character picture elements which are smaller than the picture elements of picture are stored with the higher resolving power so that the character picture elements may be interchangeable with the picture elements every one picture element of picture.

The capacity of the character memory 34 depends on the size of the character, the number of the characters to be processed in the same time, and so forth. The capacity for storing the entire layout space is unnecessary for the character memory 34, apart from the layout memory 30.

A character signal c read out of the character memory 34 is fed to a coder 36 and the picture signal $d_2$ is also fed from the memory 13 to the coder 36 via the interface 31. In the coder 36 the two signals c and $d_2$ are mixed, and a mixed signal m is sent from the coder 36 to the layout memory 30. The layout memory 30 has a capacity enough to store the maximum area processed by the recording scanning means 2, and when the data is written in, the picture and the characters are laid out in the certain layout positions by addressing in a certain order.

After the completion of the layout operation, the mixed signal m is read out of the layout memory by addressing in synchronization with the recording scanning means 2, and the read out mixed signal m is sent to a decoder 37 arranged between the layout memory 30 and the halftone dot signal generator 26. The decoder 37 separates the mixed signal m into the picture signal $d_2$ and the character signal c, and further separates the character picture signal bits from the character signal c.

The picture signal $d_2$ separated by the decoder 37 and a background picture signal $d_3$ hereinafter described are sent to the halftone dot signal generator 26 as a picture signal $d_4$. The halftone dot signal generator 26 outputs the light path open-close control signal $l_1$ to the halftone dot-character selector 38 positioned between the halftone dot signal generator 26 and the light path open-close controller 27 in the recording head 22. The halftone dot-character selector 38 overlaps the character data onto the light path open-close control signal $l_1$ depending on the data picked up from the character picture element bits and the separation bit of the binary code, which are separated by the decoder 37, as hereinafter described in detail.

In FIG. 2 there is shown an enlarged halftone picture including the character, obtained in the manner described above, wherein the picture is reproduced by means of the halftone dots 39 having a halftone dot area rate of 12.5% depending on the density and the part of the character 40 is shown. In FIG. 2, $P_1$ means a screen pitch, $P_2$ means a pitch of the picture element of picture, $P_3$ means a pitch of a unit area for forming the halftone dot in a mosaic pattern, and areas of picture elements S of picture are divided by broken lines.

As shown in FIG. 2, ten light beams passing through the ten exposure light paths $L_1$-$L_{10}$ are aligned in series in the moving direction of the recording head 22, and ten unit areas for forming the halftone dot 39 are aligned in the scanning direction. Therefore, in this embodiment, $P_2 = nP_3 = 10P_3$ is satisfied, wherein $P_3$ corresponds to the width of the scanning line of the light beam. In the halftone dot structure shown in FIG. 2, the screen pitch $P_1$ and the picture element pitch $P_2$ are related as $P_1 = 2P_2$.

In FIG. 3 there are shown the picture elements S and the four character picture elements A, B, C and D which correspond to one picture element S.

In the character memory 34, a set of character picture element data (A,B,C,D), included in the picture element S, corresponds to one address so that the four character picture elements A, B, C and D may be freely interchangeable with one picture element S. The data format of the character signal c is shown in FIG. 4.

Since the character is only expressed by the two values such as white and black, each of the character picture element A, B, C and D is represented by a data of one bit, and the lower four bits of the one word of 8 bits are used for the four character picture elements A, B, C and D.

In the higher four bits of the one word of 8 bits, the separation bit E which indicates whether the recording area of the picture element S includes the character picture elements A-D or not, and the discrimination bit F which discriminates whether the background picture is added to the recording area of the picture element S including the character picture elements A - D are aligned in the upper two bits of the lower four bits for the character picture elements A-D, and 0 bits are aligned in the uppermost two bits so that a value indicated by the lower six bits may be at most 64 of a decimal value.

Meanwhile, the addresses of the layout memory 30 are controlled by an address signal generator 41 so that the address numbers may be changed at the period corresponding to the pitch $P_2$ of the picture element S. In the halftone dot signal generator 26, the halftone dot signal is controlled in synchronization with the clock pulse $g_5$, generated by the timing controller 25, having a period corresponding to the pitch $P_3$ of the unit area.

The clock pulse $g_5$ is fed to a 1/n divider 42 in which the clock pulse $g_5$ is divided by a number n corresponding to the exposure light beams, for example, ten in this case, to obtain a pulse $g_7$ having a period corresponding to the pitch $P_2$, and thus the obtained pulse $g_7$ is sent to the address signal generator 41.

The pulse $g_7$ generated by the divider 42 is sent to a monostable multivibrator 43 in which the pulse $g_7$ is converted into a pulse $g_8$ having a duty cycle of 50% in order to obtain a timing corresponding to a pitch $P_4$ of the character picture element, and this pulse $g_8$ is sent to the halftone dot-character selector 38.

Figure 5:
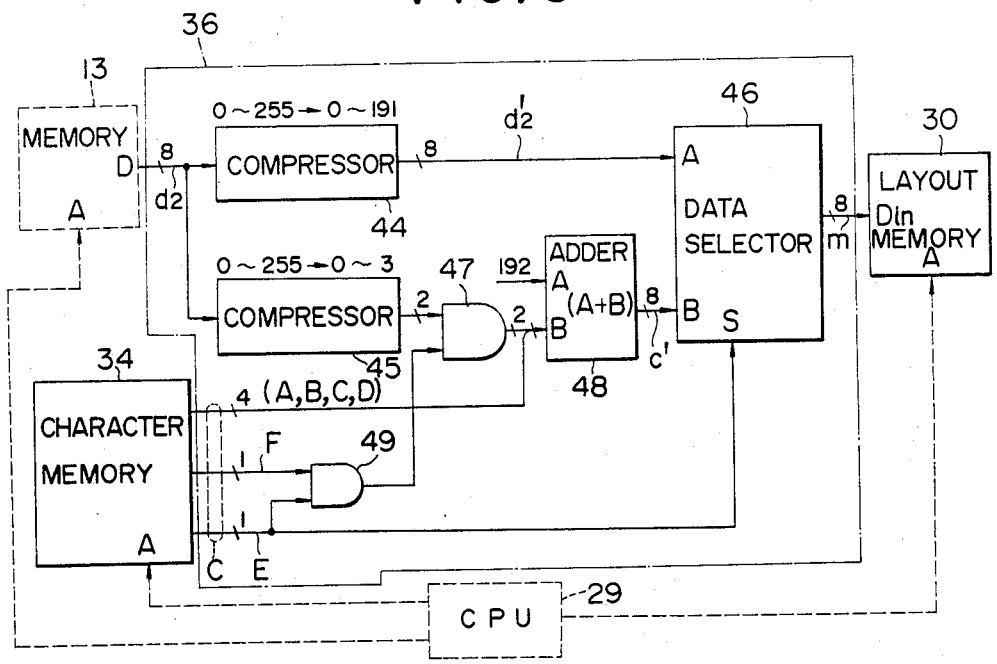
FIG. 5 is a block diagram of one embodiment of a coder shown in FIG. 1.

In FIG. 5 there is shown one embodiment of the coder 36 of the layout means 3 of FIG. 1, wherein the interface 31 is omitted.

The picture signal $d_2$ read out of the memory 13 by the CPU 29 is fed to the first and the second compressors 44 and 45. The first compressor 44 compresses the density steps of 0-255 of the picture signal $d_2$ to those of 0-191, while its bit number is maintained to 8 bits, to obtain a second picture signal $d_2'$ which is sent to one channel of a data selector 46. The second compressor 45 compresses the picture signal $d_2$ having the density steps of 0-255 to output another signal of 2 bits having density steps of 0-3, which is sent to upper bits of one input terminal of an adder 48 via an AND gate 47. The four bits data of the character picture element A-D, output from the character memory 34, are input to lower bits of the one input terminal of the adder 48.

A data corresponding to a decimal value 192 is input to the other input terminal of the adder 48. The adder 48 adds the values input to the input terminals to output a second character signal $c'$ of 8 bits having more than the decimal value 192 to the other channel of the data selector 46.

The data selector 46 selects one of the data input to the channels by the data of the separation bit E which is output from the character memory 34, and outputs the mixed signal m to the layout memory 30. On this occasion, when the data of the separation bit E indicates that the recording area of the picture element S includes the character picture elements A–D, the data selector 46 selects to output the data sent from the adder 48.

To the data selector 46, the second picture signal $d_2'$ having a decimal value of at most 191 and the second character signal c' having a decimal value of at least 192 are input separately, and the mixed signal m can be separated at the decimal value of 192.

The data of the separation bit E and the discrimination bit F are sent to an AND gate 49, and, when both the data are "1", that is, the character exists and the background picture is to be added, the output signal of the AND gate 49 is fed to the AND gate 47 and opens the same, thereby sending the output data of the second compressor 45 to the adder 48.

The output data of the second compressor 45 is compresse to four kinds of density steps of 0–3, as described above. In this case, the input density value ranges, the compressed values, the converted density values or the extended values of the decoder, and the halftone dot area rates are tabulated in Table 1, wherein the values are shown in decimal number.

TABLE 1

| Input Density Value Range | Compressed Value | Converted Density Value (Extended Value) | Halftone dot Area Rate % |
|---|---|---|---|
| 0–63 | 0 | 0 | 0 |
| 64–127 | 1 | 64 | 25 |
| 128–191 | 2 | 128 | 50 |
| 192–255 | 3 | 192 | 75 |

The writing addresses of the layout memory 30 are controlled by the CPU 29, and the picture signal $d_2$ and the character signal c which are to be written in the layout memory 30, are read out of the memory 13 and the character memory 34 by addressing the predetermined addresses by means of the CPU 29.

In these circumstances, the picture signal $d_2$ is read out of the memory 13 regardless of the character signal c and the character signal c is read out of the character memory 34 by the order of the CPU 29 only when the addresses of the layout memory 30 are come up to those for storing the character. In the code 36, the character signal c is preferentially processed.

Consequently, the character memory 34 may have the capacity enough to store the maximum character data to be processed, and thus need not the capacity for storing the entire layout addresses. Further, depending on the processing by the CPU 29, the processing can be carried out every character, and hence the capacity of the character memory 34 can be reduced to that for one character of the maximum size.

Figure 6:
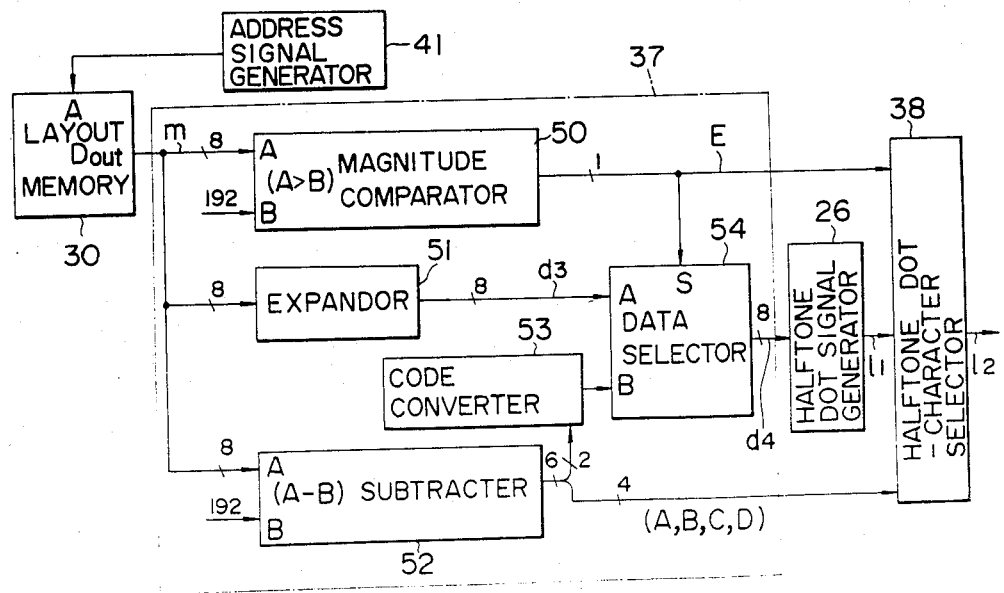
FIG. 6 is a block diagram of one embodiment of a decoder shown in FIG. 1.

In FIG. 6 there is shown one embodiment of the decoder 37 of FIG. 1, which decodes the picture signal $d_2$ and the character signal c from the mixed signal m read out of the layout memory 30.

The mixed signal m read out of the layout memory 30 is fed to one input terminal of a magnitude comparator 50, an expandor 51, and a minuend input terminal of a subtracter 52.

The magnitude comparator 50 compares the mixed signal m with the binary code representing the decimal number of 192 which is input to the other input terminal of the magnitude comparator 50. When the mixed signal m is larger than the binary code representing the decimal number of 192, the magnitude comparator 50 outputs the data of the separation bit E which indicates that the mixed signal m is the second character signal c', to the halftone dot-character selector 38

The expandor 51 expands the span of 0–191 of the second picture signal $d_2'$ having the density steps of 0–191 to the span of 0–255 by a code converter having a table, such as a ROM (read only memory), thereby obtaining a picture signal $d_3$ having 192 density steps, which is sent to one input channel of a data selector 54.

The subtractor 52 subtracts the value corresponding to the decimal number of 192 from the mixed signal m, and when the mixed signal m input is the second character signal c', the subtracter 52 outputs a code of 6 bits having the same bit pattern as the input signal of the adder 48.

The code of the upper two bits of the output signal of the subtracter 52 is sent to a code converter 53 in which the two bit code representing a decimal value of 0–3 is converted into a code corresponding to a density signal of 8 bits, as shown in Table 1, which is sent to the other input channel of the data selector 54. The code of the lower four bits of the output signal of the subtracter 52 is sent to the halftone dot-character selector 38 as a code of the character picture elements A–D.

The data selector 54 outputs a signal $d_4$ to the halftone dot signal generator 26. That is, the output of the data selector 54 is so selected by the data of the separation bit E that, when the data of the separation bit E indicates that the mixed signal m is the second character signal c', the data selector 46 may send the output signal for the background picture from the code converter 53 to the halftone dot signal generator 26, or when the data of the separation bit E indicates that the mixed signal m is the second picture signal $d_2'$, the data selector 46 may send the picture signal $d_3$ of the expandor 51 to the halftone dot signal generator 26.

Figure 7:
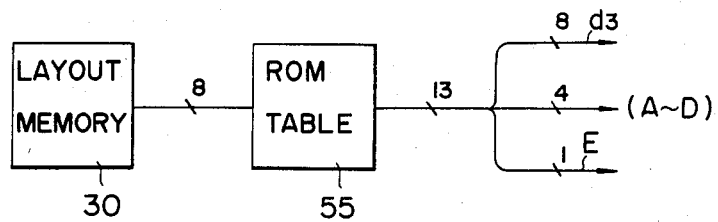
FIG. 7 is a block diagram of another embodiment of a decoder shown in FIG. 1.

In FIG. 7 there is shown another embodiment of the decoder 37 of FIG. 1, which comprises a ROM table 55. In this embodiment, the mixed signal m is decoded to the signal $d_3$, the code of the character picture elements A–D, and the code of the separation bit E by the ROM table 55 which outputs the data of 13 bits by addressing the data of 8 bits.

Figure 8:
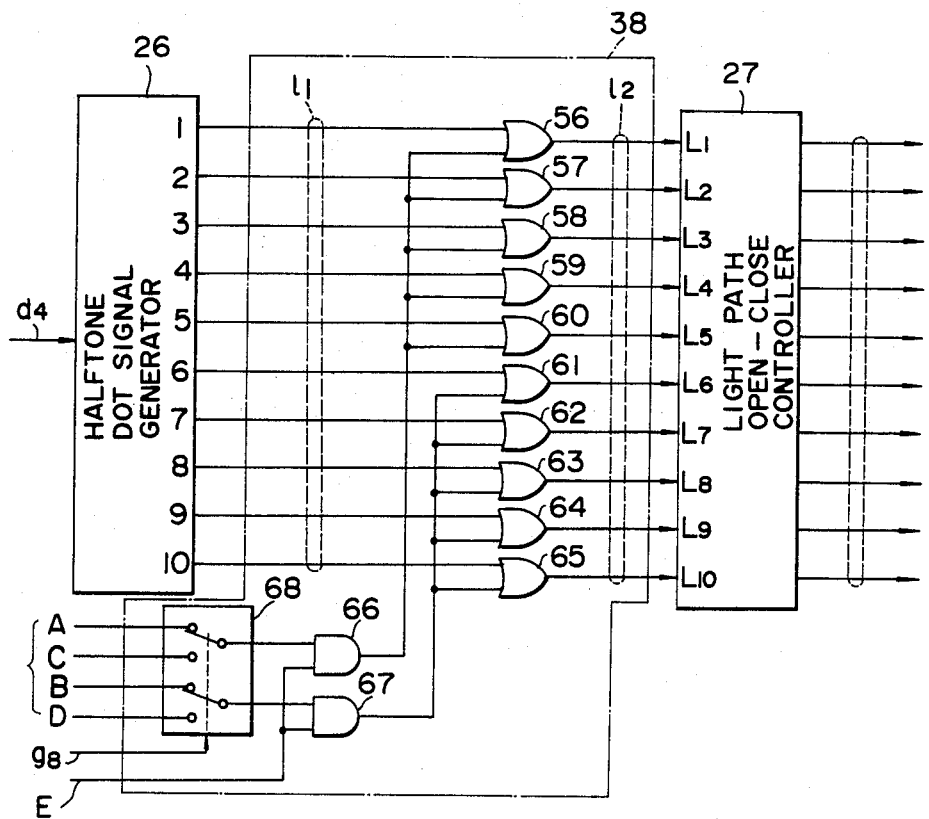
FIG. 8 is a block diagram of one embodiment of a halftone dot-character selector shown in FIG. 1.

In FIG. 8 there is shown one embodiment of the halftone dot-character selector 38 of FIG. 1.

The halftone dot signal generator 26 outputs ten bits of light path open-close control signals $l_1$ to one input terminals of ten OR gates 56–65, and the output signals of the ten OR gates 56–65 are sent to the light path openclose controller 27 as the control signal $l_2$ which control the light paths $L_1$–$L_{10}$ to open or close them independently.

An AND gate 66 selectively passes the data of the character picture elements A and C and outputs a signal to the OR gates 56–60, in common, and an AND gate 67 selectively passes the data of the character picture elements B and D and outputs a signal to the OR gates 61–65, in common.

These AND gates 66 and 67 are controlled by the data of the separation bit E to be opened or closed, i.e. when the data of the separation bit E indicates that the mixed signal m is the second character signal c', the AND gates 66 and 67 are opened by the data of the separation bit E, thereby passing the data of the character picture elements A–D.

In a multiplexor 68, the data of the character picture elements A and C and the data of the character picture element B and D are changed alternately every half pitch of the picture element pitch $P_2$ by the pulse $g_8$ generated by the monostable multivibrator 43, resulting in outputting the data of the character picture elements A and B or C and D to the AND gates 66 and 67.

When the data of the separation bit E indicates that the mixed signal m is the second character signal c′, the signal $d_4$ input to the halftone dot signal generator 26 is the signal representing the background picture, and the light path open-close control signal $l_1$ obtained by this signal $d_4$ passes the OR gates 56–65. On this occasion, the halftone dot of dots are recorded in the character picture element area or areas in which the character may not be recorded.

When the white character is recorded in the dark background, the OR gates 56–65 are replaced with the corresponding number or AND gates, and the AND gates 66 and 67 are changed by NAND gates.

It is readily understood from the above description that according to the present invention a reproduction picture including a picture and a character is recorded by a mixed signal which is obtained by mixing a picture signal and a character signal and which is stored in the same address of a layout memory. However, the present method is not restricted to this method, for example, the picture signal and the character signal are selectively fed to the halftone dot-character selector from a conventional layout system or a conventional photo-composing system.

According to the present invention, when the reproduction picture including the picture and the character is recorded in the desired layout positions, the picture signal having a continuous gradation and the character signal having two-value levels are processed in parallel to produce the mixed signal by selectively outputting one of the two signals, and then the reproduction picture is recorded by using one recording head according to the obtained signal.

In the embodiment described above, the character can be reproduced faithfully with the higher resolving power than the picture by recording the finer character picture elements than the picture elements of the picture.

Although the present invention has been described in some detail by way of illustration and example for purposes of clarity of understanding, it will, of course, be understood that various changes and modifications thereof may be made in the form, details, and arrangements of the parts without departing from the scope of the present invention.

For example, one of the memories 13 and 30 of the picture scanning means 1 and the layout means 3 can be omitted by using a buffer memory having a small capacity while the one memory is used, in common, for the picture scanning and the layout.

What is claimed is:

1. A method for the economical recording and reproducing of images including (1) picture areas of low spatial resolution having a wide gradation of intensity levels, and character or letter areas which are black or white but have higher spatial resolution requirements comprising, the steps of:
    (1) recording the picture area elements of a first predetermined size with a substantially continuous gradation of intensity, in digital format;
    (2) recording the character or letter areas by subdividing the said predetermined picture element size to smaller areas of a second predetermined size, together with indications as to whether each of the smaller areas are black or white, in digital format;
    (3) including as part of the recorded digital format for the recorded information one bit which indicates whether the recorded information represents a picture area as noted in (1) hereinabove, or a character or letter area as noted in (2) hereinabove; and
    (4) decoding and generating a new physical representation of the combined picture and character or letter areas, with the picture areas being reproduced in multiple intensity gradations with relatively coarse spatial resolution, and the character or letter areas being reproduced in half-tone or black and white with relatively fine spatial definition or resolution.

2. A method as defined in claim 1 including the step of generating the characters or letters by typing the characters or letters on a keyboard.

3. A method as defined in claim 1 including the step of recording character or letter areas which are one-fourth said first predetermined size of the picture area elements.

4. A method as defined in claim 1 wherein the generation of the new physical representation of said picture and character or letter area includes (1) the application of signals to a recording medium in the form of a series of parallel dots from a set of aligned image generating elements, (2) the energization of a varying proportion of said image-generating elements to represent picture area intensity levels, and (3) the selective energization of spaced ones of said image-generating elements to give improved spatial representation of said character or letter areas.

5. A system: for the economical recording and reproducing of images including (1) picture areas of low spatial resolution having a wide gradation of intensity levels, and character or letter areas which are black or white but have higher spatial resolution requirements comprising:.
    (1) means for recording the picture area elements of a first predetermined size with a substantially continuous gradation of intensity, in digital format;
    (2) means for recording the character or letter areas by subdividing the said predetermined picture element size to smaller areas of a second predetermined size, together with indications as to whether each of the smaller areas are black or white, in digital format;
    (3) means for including as part of the recorded digital format for the recorded information one bit which indicates whether the recorded information represents a picture area as noted in (1) hereinabove, or a character or letter area as noted in (2) hereinabove; and
    (4) means for recording and generating a new physical representation of the combined picture and character or letter areas, with the picture areas being reproduced in multiple intensity gradations with relatively coarse spatial resolution, and the character or letter areas being reproduced in half-tone or black and white with relatively fine spatial definition or resolution.

6. A system as defined in claim 5 including means for generating the characters or letters by typing the characters on a keyboard.

7. A system as defined in claim 5 including means for recording a digital representation of character or letter areas which are one-fourth said first predetermined size of the picture area elements.

8. A system as defined in claim 5 including means for recording the black or white nature of several small character or letter areas in a set of bits of digital information equal in length to the number of bits of information representing the darkness level of larger elemental picture areas each equal in extent to the several small character or letter areas represented by said set of bits of digital information.

9. A method as defined in claim 5 wherein the means for generating a new physical representation of said picture and character or letter areas includes (1) means for applying signals to a recording medium in the form of a series of parallel dots from a set of aligned image generating elements, (2) means for energizing a varying proportion of said image generating elements to represent picture area intensity levels, and (3) means for energizing selected ones of said image generating elements to give improved spatial representation of said character or letter areas.

10. A system as defined in claim 9 wherein said last mentioned energizing means includes means for selectively turning a first half and/or a second half of said image-generating elements on or off.

* * * * *